March 25, 1930. L. A. BROWN 1,751,902
WHEELED SHOPPING BAG
Filed June 5, 1928
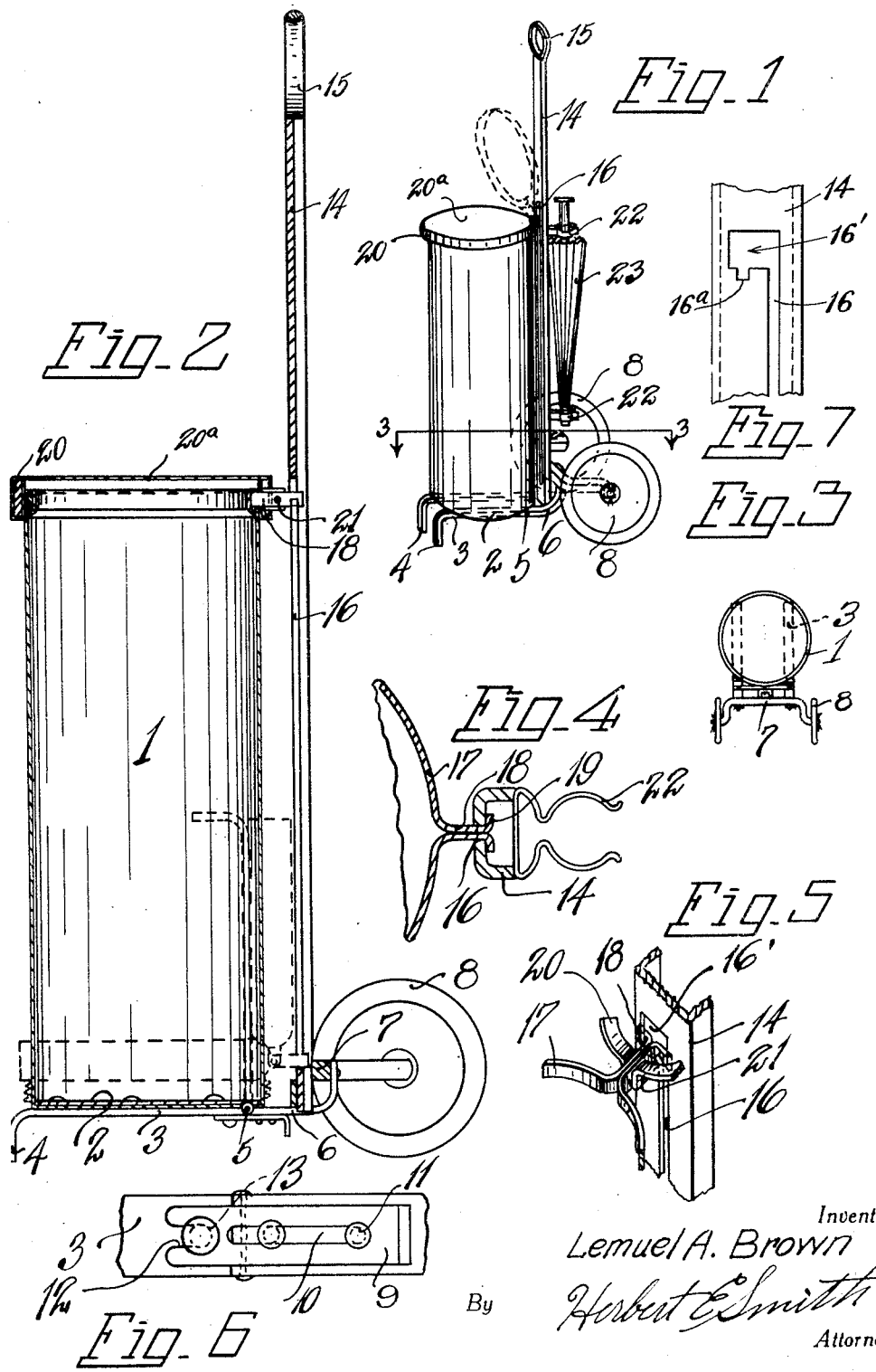
Inventor
Lemuel A. Brown
By Herbert E Smith
Attorney Patented Mar. 25, 1930

1,751,902

UNITED STATES PATENT OFFICE

LEMUEL A. BROWN, OF CHARLESTON, WASHINGTON

WHEELED SHOPPING BAG

Application filed June 5, 1928. Serial No. 283,087.

The present invention relates to an improved wheeled shopping bag which may be trundled to market or to the store for the purpose of carrying or conveying groceries, provisions, or other commodities in a convenient and facile manner. The invention contemplates the employment of a collapsible bag of flexible material, as canvas, which is provided with means for supporting it in extended position upon the wheeled-frame, and means are also provided for collapsing and folding the extended bag into compact form on the carrier or wheeled frame when it is not to be used for conveying goods or commodities.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of the appliance of my invention showing the cover or lid in open, dotted line position. Figure 2 is an enlarged, vertical sectional view of the appliance shown resting on its two wheels and supporting legs, the bag being shown by dotted lines in collapsed, folded position. Figure 3 is a transverse sectional view as on the horizontal line 3—3 of Figure 1. Figure 4 is an enlarged detail, horizontal sectional view showing the bag holder. Figure 5 is a detail perspective view showing the bag holder and a portion of the pivoted lid or cover for the bag. Figure 6 is a bottom plan view of a slide lock for the hinged carrier frame. Figure 7 is a detail face view of part of the handle.

In the preferred embodiment of my invention I utilize a flexible bag 1 of canvas or other suitable material and fashioned in cylindrical shape. The bag is provided with a circular base or bottom 2 that is supported on a pair of parallel arms 3 that terminate in legs 4. The arms form part of the carrier frame that is hinged at 5 to the rear frame 6, and this frame supports the axle 7 upon which the two wheels 8 are journaled.

When the bag is collapsed, the hinged frame may be folded to the position indicated in dotted lines Figure 2, and when the hinged frame is extended it is locked rigidly in this position by means of one or more slide bolts 9 at the underside of the frame. Each slide bolt has a slot 10 that co-acts with the headed pins or bolts 11 fixed to the frame 6 and the slide bolt has a notched end 12 that co-acts with a headed lock pin 13 on the arm 3. With the slide bolt in position of Figures 2 and 6 the hinged frame is rigidly locked in extended position to support the bag in extended position. By slipping the slide bolt to the right in Figure 6 the hinged frame is released so that the folded or collapsed bag may be folded, with the arms 2 to dotted position in Figure 2.

The bag may be supported in extended position by the two wheels 8 and the legs 4 while being filled, or by using the handle 14, the weight of the appliance may be swung over on the two wheels and then the bag may be trundled or wheeled to its destination.

The handle 14 is preferably fashioned from sheet metal in channel shape to provide a strong but light element and it is provided at its upper end with a ring or loop 15 to be used as a hand grasp. At its lower end the handle is rigidly fixed to the rear carrier frame 6 so that the appliance may be manipulated with facility by the hand that grasps the handle.

Throughout its length the handle is fashioned with a central slot 16 that terminates at its upper end in offset or enlargement 16' and this slot and its offset are designed to guide the movement of the bag holder and to co-act in retaining the bag in extended position. The bottom wall of the offset slot 16' is fashioned with a notch 16$^a$ to receive the holder arms 18, to be described. For this purpose the bag is provided with a top brace ring 17 to which its upper edge is fixed, and the brace ring has a pair of radial arms 18 that form the holder and are designed to travel in the slot 16. The ends of these arms 18 are passed through the slot of the handle and bent to diverging positions as indicated at 19, and these flanged ends 19 retain the holder in its slot. When the bag is extended, as in Figures 1 and 2, the holder arms 18 are shifted laterally from the top of the slot 16 into the offset recess 16' and are then seated in the notch 16ᵃ to maintain the walls of the bag in extended position. To collapse the bag the holder arms 18 are shifted from the recess into the slot and then the bag may be collapsed, the holder arms 18 traveling down the slot as a guide for the bag.

A lid or cover is provided for the bag and comprises a metal ring 20 that fits over the holder ring 17 of the bag, and a covering 20ᵃ, as of canvas. The ring 20 has arms that are pivoted at 21 on the holder so that the lid may be swung to open or closed position as desired.

As a convenient accessory for the use of the shopper, spring clips 22 may be affixed at the rear side of the handle for the reception and retention of an umbrella 23 or other similar article, or the clips may be used as suspending hooks for various commodities.

From the above description taken in connection with my drawings it will be apparent that I have provided a wheeled appliance that may be manipulated with facility when conveying or carrying a load of marketing, and one which may with equal facility be compactly folded into small compass, when empty, to facilitate its handling.

Having thus fully described my invention, what I claim as new and desire to secure by Letters Patent is:—

1. The combination with a wheeled frame having a slotted handle, of a collapsible bag secured to said frame, a bag-holder adapted to slide in said slotted handle, and means on the handle to support the holder with the bag in extended position.

2. The combination with a hinged, wheeled frame having a slotted handle and a recess in the soltted handle, of means for locking the hinged frame in extended position, a collapsible bag secured to the hinged frame, a bag holder secured at the upper end of the bag, guide arms on said holder adapted to travel in the slotted handle, said guide arms adapted to rest in the recess to support the bag in extended position, and a hinged lid for said bag.

3. The combination with a frame having supporting wheels, a hinged frame having legs, and releasable means for rigidly fastening together said frames, of a bag secured to the hinged frame, a handle rigid with the first frame, a bag holder mounted at the upper free end of the bag, and co-acting means on the handle and holder for guiding the movement of the bag as it is extended, and for retaining the bag in extended position.

In testimony whereof I affix my signature.

LEMUEL A. BROWN.